US009009855B2

(12) United States Patent
Dwivedi et al.

(10) Patent No.: US 9,009,855 B2
(45) Date of Patent: Apr. 14, 2015

(54) GENERATING DEVELOPER LICENSE TO EXECUTE DEVELOPER APPLICATION

(75) Inventors: Sanjeev Dwivedi, Sammamish, WA (US); Sunil Shankar Kadam, Redmond, WA (US); George Li, Bellevue, WA (US); Ariye M. Cohen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 360 days.

(21) Appl. No.: 13/229,744

(22) Filed: Sep. 11, 2011

(65) Prior Publication Data

US 2013/0067601 A1    Mar. 14, 2013

(51) Int. Cl.
*G06F 21/00* (2013.01)
*G06F 21/12* (2013.01)
*G06F 21/10* (2013.01)

(52) U.S. Cl.
CPC ............ *G06F 21/121* (2013.01); *G06F 21/105* (2013.01); *G06F 2221/0704* (2013.01)

(58) Field of Classification Search
None
See application file for complete search history.

(56) References Cited

U.S. PATENT DOCUMENTS

| | | | | |
|---|---|---|---|---|
| 5,758,069 | A * | 5/1998 | Olsen | 726/27 |
| 7,051,200 | B1 * | 5/2006 | Manferdelli et al. | 713/153 |
| 7,111,285 | B2 * | 9/2006 | Smith et al. | 717/140 |
| 7,461,249 | B1 * | 12/2008 | Pearson et al. | 713/156 |
| 7,680,742 | B1 * | 3/2010 | Ackerman et al. | 705/59 |
| 7,711,952 | B2 * | 5/2010 | Teal et al. | 713/156 |
| 7,890,926 | B2 | 2/2011 | Balathandapani et al. | |
| 7,891,012 | B1 * | 2/2011 | Kiel et al. | 726/30 |
| 7,895,124 | B2 * | 2/2011 | Baratti et al. | 705/57 |
| 8,285,949 | B2 * | 10/2012 | De Atley et al. | 711/154 |
| 2003/0233547 | A1 | 12/2003 | Gaston et al. | |
| 2004/0025033 | A1 | 2/2004 | Todd | |
| 2004/0039916 | A1 * | 2/2004 | Aldis et al. | 713/177 |
| 2004/0054920 | A1 * | 3/2004 | Wilson et al. | 713/200 |
| 2004/0093505 | A1 * | 5/2004 | Hatakeyama et al. | 713/189 |

(Continued)

OTHER PUBLICATIONS

Korba, Larry. Towards Secure Agent Distribution and Communication. Proceedings of the 32nd Annual Hawaii International Conference on Systems Sciences. vol. Track 8. Pub. Date: 1999. Relevant pp. 1-10. http://ieeexplore.ieee.org/stamp/stamp.jsp?tp=&arnumber=773091.*

(Continued)

*Primary Examiner* — Dede Zecher
*Assistant Examiner* — Jeremiah Avery
(74) *Attorney, Agent, or Firm* — Bryan Webster; Kate Drakos; Micky Minhas

(57) ABSTRACT

One or more techniques and/or systems are disclosed for generating a developer license that allows a developer application to run on developer machine. A user identification (userID) used to register a user can be used by the user to register as a developer. The userID can be authenticated for the registered developer. Further, a machine used by the developer for the developer application can be registered, and a resulting hardware identification (hardwareID) can be authenticated for the registered developer machine. Additionally, a developer certificate can be generated for the registered developer. The developer certificate can be authenticated and used to sign the developer application. The developer license can be generated for the developer, allowing the developer machine to execute the developer application, based at least upon the authenticated userID, the authenticated hardwareID, and the authenticated developer certificate.

20 Claims, 7 Drawing Sheets

(56) References Cited

U.S. PATENT DOCUMENTS

| | | | |
|---|---|---|---|
| 2004/0225894 A1* | 11/2004 | Colvin | 713/200 |
| 2007/0100701 A1* | 5/2007 | Boccon-Gibod et al. | 705/21 |
| 2007/0240194 A1 | 10/2007 | Hargrave et al. | |
| 2008/0027865 A1* | 1/2008 | Usui et al. | 705/50 |
| 2009/0204821 A1* | 8/2009 | Fransson et al. | 713/187 |
| 2011/0055917 A1* | 3/2011 | Wickstrom | 726/17 |
| 2012/0110339 A1* | 5/2012 | Reed et al. | 713/185 |

OTHER PUBLICATIONS

El Guemhioui, Karim; Nys, Aymeric. A Transparent and Evolvable Licensing Object Service. Third ACIS International Conference on Software Engineering Research, Management and Applications. Pub. Date: 2005. Relevant pp. 298-305. http://ieeexplore.ieee.org/stamp/stamp.jsp?tp=&arnumber=1563176.*

Chen, Yu-Tso; Studer, Ahren; Perrig, Adrian. Combining TLS and TPMs to Achieve Device and User Authentication for Wi-Fi and WiMAX Citywide Networks. IEEE Wireless Communications and Networking Conference, 2008. WCNC 2008. Pub. Date: 2008. Relevant pp. 2804-2809. http://ieeexplore.ieee.org/stamp/stamp.jsp?tp=&arnumber=4489522.*

"Managing Devices and Digital Identities"—Retrieved Date: Jun. 20, 2011 http://developer.apple.com/library/ios/#documentation/Xcode/Conceptual/iphone_development/128-Managing_Devices_and_Digital_Identities/devices_and_identities.html.

"gumbypp's iPhone device testing page"—Retrieved Date: Jun. 20, 2011 http://iphone.gumbypp.com/provisioning.html.

"Developer-To-Developer iPhone App Distribution Without Ad-Hoc Provisioning"—Retrieved Date: Jun. 20, 2011 http://mobileorchard.com/developer-to-developer-iphone-app-distribution-without-ad-hoc-provisioning/.

"Deploying iPhone Apps to Real Devices"—Retrieved Date: Jun. 20, 2011 http://mobiforge.com/developing/story/deploying-iphone-apps-real-devices/.

* cited by examiner

GENERATING DEVELOPER LICENSE TO EXECUTE DEVELOPER APPLICATION

BACKGROUND

Computing devices typically comprise a device platform environment, such as a device operating system, that provides an operating environment in which an application may execute on the device. Often, an application is developed to execute merely in one particular device platform environment, such that a different version of the application may be needed for respective different device platform environments. Further, an executable version of an application can be provided to a computing device in a variety ways, including via an external data storage component (e.g., disk, portable memory, etc.), a network source connected to the device and/or from an online network site (e.g., website) to which the device has connected.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Some device platform environments used by a computing device comprise "closed systems", in which, merely those applications that are certified and/or signed by an authority of the device platform environment, can execute. That is, for example, if a user attempts to execute an unsigned/uncertified application in the device platform environment, the execution may be blocked. An owner of a particular device platform environment may wish to prevent unsigned/uncertified applications from operating for security purposes (e.g., mitigating malicious code) and/or to provide a desirable user experience (e.g., mitigating poorly written code, undesirable programs, etc.).

However, preventing unsigned and/or uncertified applications from executing in the particular device platform can also prevent an application developer from running and testing their applications. For example, a developer may wish to write an application for the particular device platform environment. In this example, prior to certification and deployment (e.g., to an online application store) the developer may wish to test and execute the application in the device platform environment to test for a desirable end-user experience. During development, the developer application (e.g., in development, prior to certification and/or deployment) will not be certified or signed by the authority for the device platform environment (e.g., because it may not yet be secure and/or provide the desired user experience). Therefore, the developer may be prevented from effectively testing their developer application in the device platform environment.

Accordingly, one or more techniques and/or systems are disclosed for an application developer to develop and deploy an application, for example, in a closed system, such as where merely a certified application may be deployed. A developer license may be issued to the developer, where the developer is registered and has been authenticated. Further, the developer license may limit execution of the developer application merely to a particular developer machine. Additionally, the developer license may merely allow the developer application to execute in the device platform environment if the application is signed by an authenticated developer certificate.

In one embodiment of generating a developer license that allows a developer application to run on developer machine, a registered developer can be authenticated, based at least upon a registered user identification (userID) for the registered developer. Further, a registered developer machine may be authenticated using a registered hardware identification (hardwareID) for the registered developer machine. Additionally, a developer certificate, used to sign the developer application, may be authenticated. The developer license can be generated based on the authenticated userID, authenticated hardwareID, and authenticated developer certificate, where the developer license can be used to allow the developer application to run on the registered developer machine.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
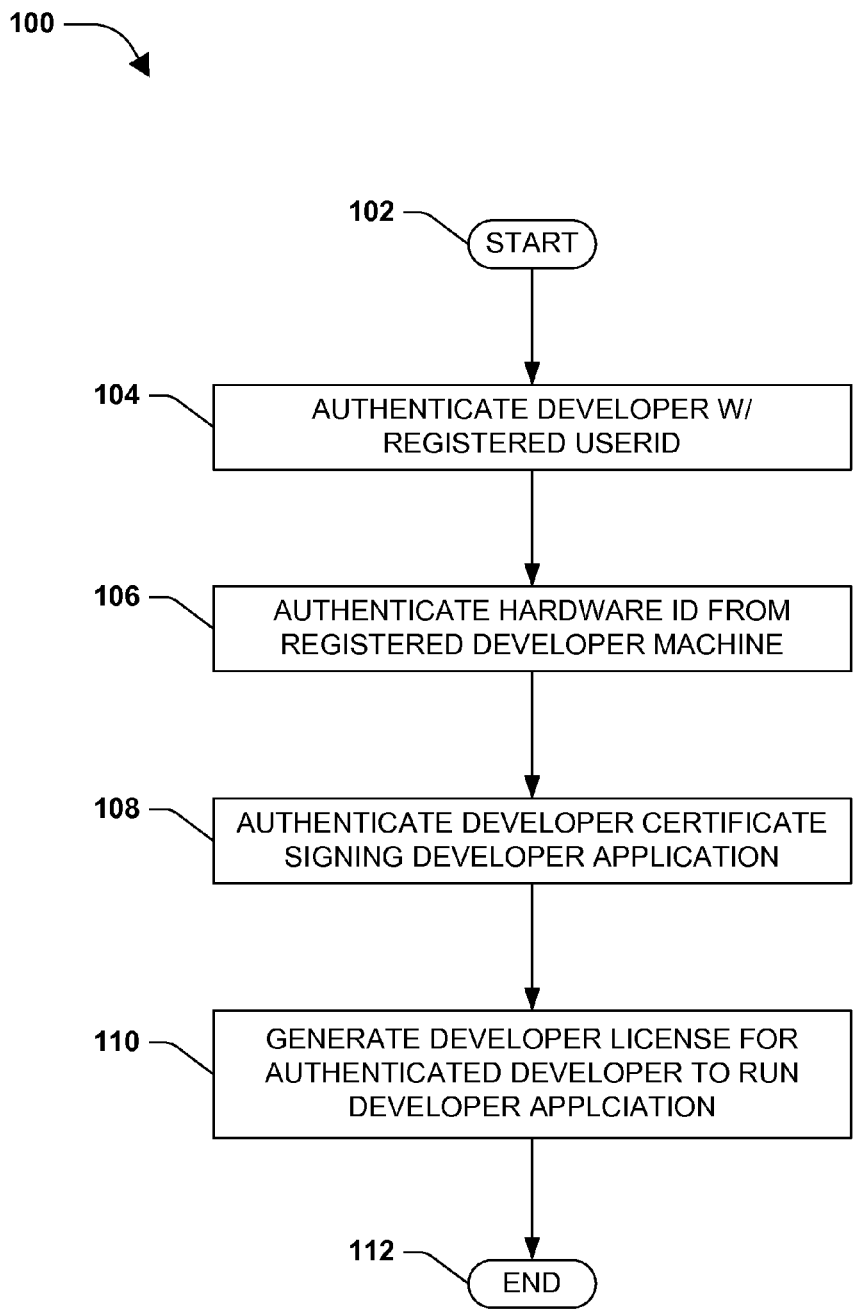
FIG. 1 is a flow diagram illustrating an exemplary method for generating a developer license that allows a developer application to run on developer machine.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As provided herein, one or more techniques and/or systems may be devised that provide for an application developer to develop and deploy an application, for example, in a closed system, such as where merely a certified application may be deployed. As an illustrative example, a developer that may be in the process of developing an application for deployment to an online application store may merely be able to work on the application if the application has been certified for use in a device platform environment (e.g., operating system (OS)) supported by the application store (e.g., for security purposes, where the store provides applications that execute in the particular device platform environment). A developer license can be issued to the developer so that the developer's application can be tested and executed in the device platform environment on the developer's machine that comprises the device platform environment, for example (e.g., has a particular OS installed thereon).

FIG. 1 is a flow diagram illustrating an exemplary method 100 for generating a developer license that allows a developer application to run on developer machine, such as in a device platform environment comprised on a machine used by a developer of the application. The exemplary method 100 begins at 102 and involves authenticating a registered developer based at least upon a registered user identification (userID) for the registered developer, at 104. For example, a user registered with an online service typically has a userID associated with personal identification information provided to the online service. During a user registration processes with the online service, the user can provide personal identification information to identify the user to the online service. In this way, for example, the userID can be linked with a known user, who may use the userID to register as an application developer with an online application development service (e.g., an online application store).

As an example, a registered developer may be able to identify themselves to the online application development service using the registered userID. Further, in this example, the online application development service may require developers registered with the service to obtain a developer license in order to run and/or test developer applications on their own machines. In this example, to obtain the developer license, the userID for the registered developer can be authenticated, such as by comparing the userID (e.g., and related security information, such as a secret key) to information associated with the registered user, stored by the online application development service.

At 106 in the exemplary method 100, a hardware identification (hardwareID) associated with a developer machine (e.g., a computer used by the developer to develop, test and/or execute the developer application) can be authenticated. As an example, a developer machine, such as a personal computing device used by the registered developer, may comprise a hardwareID that is specific to the developer machine. Further, the registered developer can register their developer machine with the online application development service, for example, so that the registered developer machine can be used to develop an application for use by the online application development service (e.g., uploaded to the online application store).

During the developer machine registration, for example, the hardwareID for the developer machine may be stored (e.g., on a server remotely situated from the developer machine) by the online application development service for authentication purposes (e.g., for subsequent comparison with a hardwareID submitted for authentication). Further, in this example, when the registered developer wishes to obtain the developer license, the online application development service may obtain the hardwareID from the developer machine submitting a request for the developer license. The obtained hardwareID can be compared to the hardwareID stored for authentication purposes by the online application development service, for example, to authenticate the developer machine comprising the hardwareID.

At 108, a developer certificate that is used to sign the developer application, for which the developer license is being requested, can be authenticated. As an example, a developer certificate can comprise a certificate associated with the developer (e.g., identifying the developer) that may be used to sign an application authored by the developer. The developer certificate can be provided by the online application development service, for example, and rooted in a network site (e.g., website) associated with online application development service (e.g., providing a trusted authority for identifying the developer). In this way, for example, the developer certificate used to sign developer application can be authenticated by comparing a serial number for the certificate to a database of developer certificates issued by the online application development service.

At 110, the developer license can be generated for the authenticated developer, for a developer application that is signed by the authenticated developer certificate. Further, the developer license provides for the authenticated developer to run the developer application, signed by the authenticated developer certificate, on the registered developer machine that comprises the authenticated hardwareID. In this way, for example, the authenticated developer may be able to test and/or execute the developer application on their authenticated machine, comprising a device platform environment supported by the online application development service, before certifying the application for use by the service (e.g., making the application available on an online application store). Having generated the developer license, the exemplary method 100 ends at 112.

Figure 2:
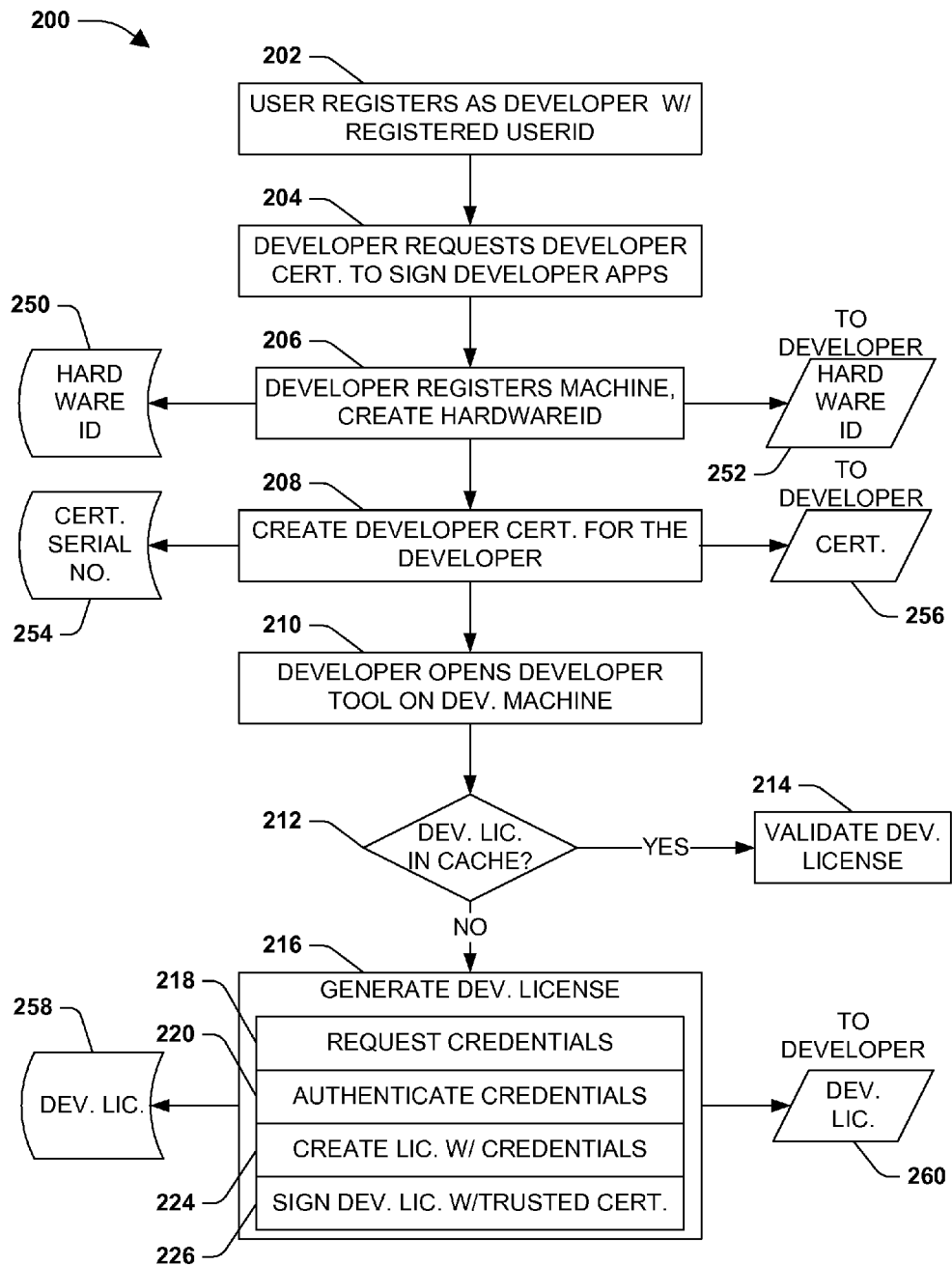
FIG. 2 is a flow diagram illustrating an example embodiment where one or more portions of one or more techniques described herein may be implemented.

FIG. 2 is a flow diagram illustrating an example embodiment 200 where one or more portions of one or more techniques described herein may be implemented. At 202, a user can register as a developer using a registered userID. As an example, the user may have registered the userID with an online service, where personal identification information is provided to the online service in exchange for registering the userID to the user. In this example, the registered use may utilize the registered userID to register as a developer. In this way, for example, the personal identification information provided for the registered userID can be associated with the registering the user as a developer for an online application development service (with which the user is registering).

At 204, the developer can request a developer certificate that may be used to sign a developer application (e.g., an application developed by the registered developer, such as for a device platform environment supported by the online application development service). A developer certificate can comprise a digital document that indicates the identity of the developer (e.g., like a written signature on a document), where the identity has been verified by a trusted authority issuing the certificate. In this way, for example, when the developer certificate is used to sign an application it can identify the owner/developer/author of the application; and indicate that the identity has been verified by the trusted authority (e.g., if the certificate is authenticated).

At 206, the developer can register a developer machine and create a hardware identification (hardwareID) for the developer machine. In one embodiment, a developer certificate issuing process (e.g., initiated at 204) may comprise registering the developer machine. For example, the online application development service may require that a request for the developer certificate come from a registered developer machine, comprising a known hardwareID (e.g., for security purposes). In one embodiment, the hardwareID may be provided to the developer 252 (e.g., stored on the developer machine) and/or stored by a service 250 generating the developer license (e.g., the online application development service).

In one embodiment, the developer machine can be registered as the registered developer machine, resulting in the hardwareID. As an example, the developer machine being registered can comprise a computing device that the developer uses to request the developer certificate, develop a developer application for the online application development service and/or request a developer license for executing the developer application in a device platform environment supported by the online application development service. In this embodiment, the registration process may provide the hardwareID for the registered machine, such as by extracting data from the developer machine that is particular to the developer machine and/or by receiving a unique hardwareID from the registered developer.

In one embodiment, the hardwareID can be created, at least in part, by combining one or more portions of one or more serial numbers that may be associated with one or more pieces of hardware comprised in the developer machine being registered. As an illustrative example, a computing device can comprise a basic input/output system (BIOS), motherboard, video card, hard disk drive, input device, memory, processor, and other components. In this example, one or more of the components in the device may comprise a serial number that can be identified. Further, one or more portions of respective identified serial numbers can be extracted, for example, and combined to create a hardwareID that is particular to the computing device. For example, a serial number is typically specific to merely one component; and, by combining one or more portions of one or more serial numbers for the device, the resulting hardwareID can be particular to merely the developer machine.

At 208 in the example embodiment 200, the developer certificate can be created for the developer. In one embodiment, the developer certificate can be rooted in a verified certificate for an online network site, such as associated with the service that is generating the developer license (e.g., an online application store). In this embodiment, for example, rooting the developer certificate in the verified certificate for the online network site can provide the "trusted authority" used to verify the identity of the developer requesting the developer license.

Further, a copy of the developer certificate can be provided to the developer 256, for example, for use by the developer to sign the developer application. In one embodiment, the generated developer certificate can be stored locally on the registered developer machine. Additionally, a serial number associated with the developer certificate can be stored remotely 254 from the developer machine (e.g., by the online application development service), for example, for use in subsequent certificate authentication (e.g., retrievable from a database identifying valid certificates).

At 210 in the example embodiment 200, the registered developer can open a developer tool (e.g., used to write, test and/or execute the developer application) on the registered developer machine. In one embodiment, opening the developer tool to interact with the developer application can initiate a response in which a developer license may be identified. As an example, the device platform environment, in which the developer application is executed, may require that a valid developer license be appropriately stored on the developer machine in order to run the developer application, and/or for the developer tool to be able to interact with the developer application.

At 212, a developer license cache on the registered developer machine may be searched to identify a developer license (e.g., and/or the developer may provide a location of the developer license on the developer machine, and/or the developer may provide the developer license). If the developer license is identified (YES at 212), the identified developer license can be validated, at 214. If the developer license is not identified (NO at 212), the developer license can be generated, at 216.

Generating the developer license for the authenticated developer can comprise requesting credentials for the developer license, at 218. For example, credentials used for creating the developer license can comprise the registered developers userID, the hardwareID for the registered developer machine, and/or the developer certificate. In one embodiment, one or more of the credentials may be provided by the registered developer, and/or one or more of the credentials may be identified on the developer machine.

For example, the registered developer may provide their userID, and the hardwareID may be retrieved from the developer machine (e.g., stored on the machine, or derived from the one or more portions of the respective serial numbers of the one or more components from the developer machine). Further, the developer certificate may be provided by the registered user, or the developer certificate (e.g., or the serial number from the certificate) may be identified from the signature of the developer application intended to be executed on the developer machine.

At 220 in the example embodiment 200, the credentials can be authenticated. Authenticating the credentials can comprise authenticating the registered userID, for example, thereby authenticating the registered developer. Further, the hardwareID for the registered developer machine can be authenticated, along with the developer certificate provided for the developer application.

As an example, the userID may be compared against a database comprising registered developers to authenticate the identity of the developer requesting the developer certificate. Additionally, as an example, the hardwareID can be can be compared against one or more hardwareIDs stored (e.g., at 250) by the service, for registered developer machines. Similarly, as an example, the serial number of the developer certificate provided for the developer application can be compared to one or more stored serial numbers (e.g., at 254) of valid developer certificates. In this way, in this example, the respective userID, hardwareID, and developer certificate may be authenticated for the registered developer, associated with the userID, wishing to execute the developer application, signed by the developer certificate, on the registered developer machine, comprising the hardwareID.

At 224 in the example embodiment 200, the developer license can be created, where the developer license comprises the authenticated credentials, comprising the authenticated userID, the authenticated hardwareID, and/or the authenticated developer certificate (e.g., the serial number or other identifier or identification of the authenticated developer certificate). That is, for example, the authenticated credentials can be embedded in the developer license in such a way that mitigates altering one or more aspects of the license.

At 226, the developer license is signed with a trusted certificate from an online network site (e.g., a trusted and/or verified website, and/or web service that authenticates certificate credentials). In one embodiment, the generated developer license can be provided to the developer 260, where the generated developer license may be stored locally on the registered developer machine (e.g., in cache). In one embodiment, the generated developer license (e.g., or an identification associated with the license) can be stored by the service generating the developer license 258 (e.g., stored remotely by the online application store), for subsequent comparison purposes (e.g., to validate the developer license).

Figure 3:
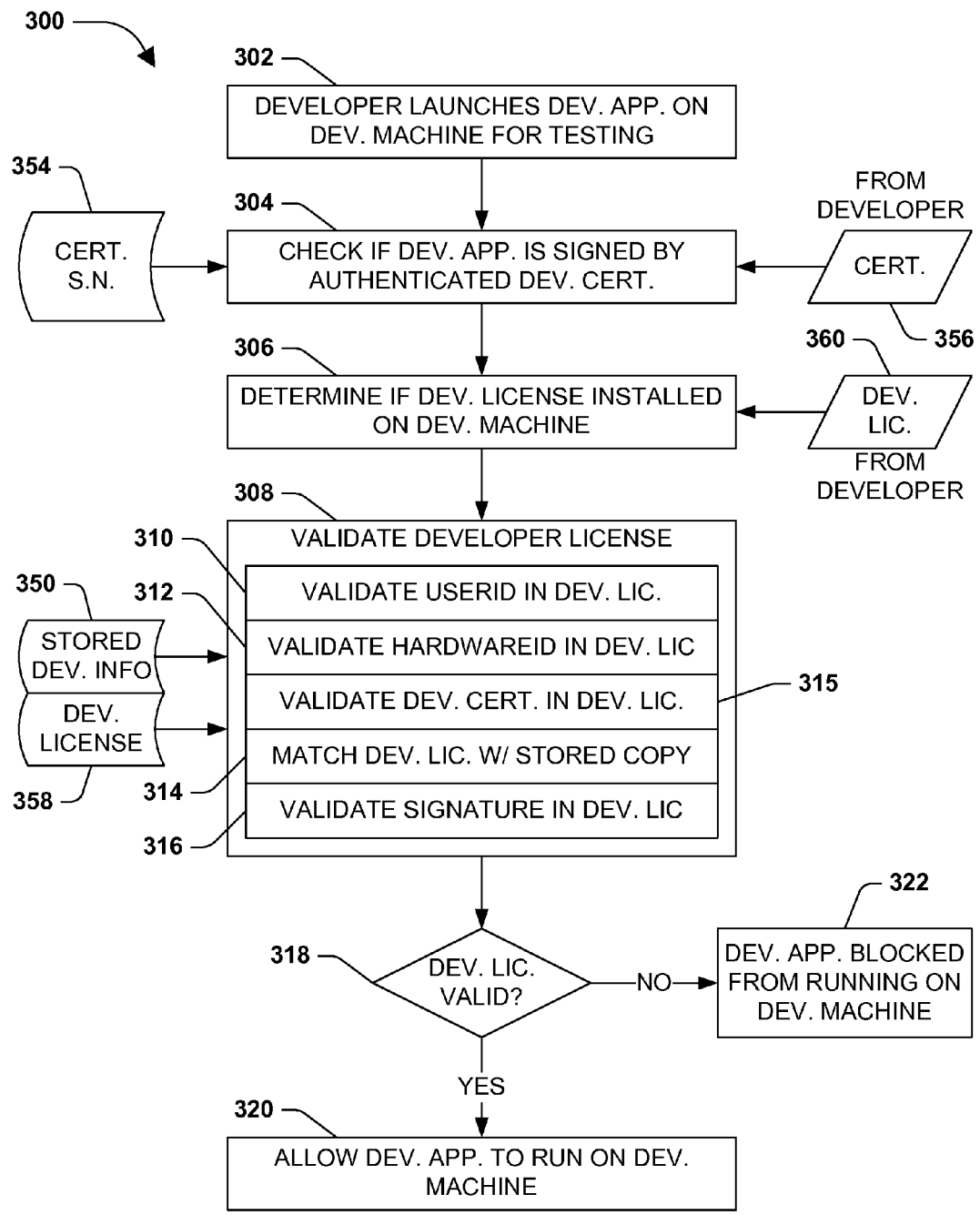
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented. At 302 a developer launches a developer application for testing on a developer machine. As an example, in one embodiment, the developer may launch the developer application by launching a developer tool on the developer machine, where the developer tool is used to write, test and/or execute the developer application. Further, upon launching the developer application, and/or the developer tool, for example, an application programming interface may automatically initiate a process by which a developer license can be provided, such that the developer application can be written, executed, and/or tested on the developer machine.

At 304, it may be determined whether the developer application is signed by an authenticated developer certificate. In one embodiment, the developer can sign the developer application with the developer certificate, at 356. If the developer application is signed by the developer certificate, an identification (e.g., serial number) associated with the developer certificate may be identified, for example. In order to determine whether the signing developer certificate is authenticated, for example, the certificate's serial number can be compared against stored serial numbers of valid developer certificates 354 (e.g., stored on a remote server by the licensing service).

At 306, if the developer application is signed by an authenticated developer certificate, it may be determined whether a developer license 360 is stored locally on the developer machine. As an example, when the developer license is generated for the developer, running the developer application, the generated developer license may be stored locally in a developer license cache. In this example, the development license cache can be searched for a developer license. In one embodiment, the developer may provide the developer license 360 (e.g., upon request), or may provide a location in which the developer license is stored on the developer machine.

At 308, if the developer license is identified on the developer device and/or provided by the developer, the identified developer license can be validated. Validating the developer license can comprise validating information comprised in the developer license 360, such as an authenticated userID, an authenticated hardwareID, the authenticated developer certificate, and/or a signature. At 310 the userID can be validated, for example, by comparing the userID in the developer license 360 with stored validation information 350 for the device and/or developer.

At 312, the hardwareID in the developer license 360 can be validated, for example, by comparing the information in the developer license 360 with the stored validation information 350 for the developer machine, and/or compared against the actual hardwareID derived from the developer machine. At 315, the developer certificate in the developer license 360 can be validated, for example, by comparing a serial number of the developer certificate in the developer license 360 with the stored validation information 350 for the device.

At 314 in the example embodiment 300, the developer license validation can comprise matching the developer license 360 stored locally on the registered developer machine and/or provided by the developer with a remotely stored developer license 358 for the developer. As an example, an identification (e.g., serial number) associated with the developer license on the developer machine can be checked against a database of identifications comprising valid developer licenses, to determine validity. At 316, the signature comprised in the developer license 360, stored locally on the registered developer machine, can be validated for the issuer of the developer license. For example, a valid developer license is signed by a trusted certificate from trusted online network site (e.g., comprising the online application development service). The trusted certificate can be validated by comparing an identification of the certificate against a list of valid certificates, for example.

If one or more portions of the developer license are not validated, for example, the developer license may not be validated. If the developer license 360 is not validated (NO at 318) the developer application can be blocked, at 322, from executing on the developer machine (e.g., or run/tested by the developer tool on the developer machine). If the developer license 360 is found to be validated (YES at 318) the developer application may be allowed to be written, tested and/or executed on the developer machine, at 320. In this way, for example, in order for the developer application to execute on the developer machine, the developer license must be installed on the registered developer machine and/or provided by the developer, the developer license must be validated (e.g., comprise valid information, an authenticated userID, an authenticated hardwareID, and a valid signature), and the developer application must be signed by an authenticated developer certificate.

A system may be devised that allows a developer to write, test and/or execute a developer application on the developer's computer, where the developer application is configured to execute in a particular device platform environment. For example, if the particular device platform environment is a "closed-type" platform, the developer application may need to be certified by an authority for the particular device platform environment before it is allowed to execute in the device platform environment. A developer license can be generated that allows the developer to write, test and/or execute the developer application on the developer's computer, for example, where the license can be validated at runtime of the developer application.

Figure 4:
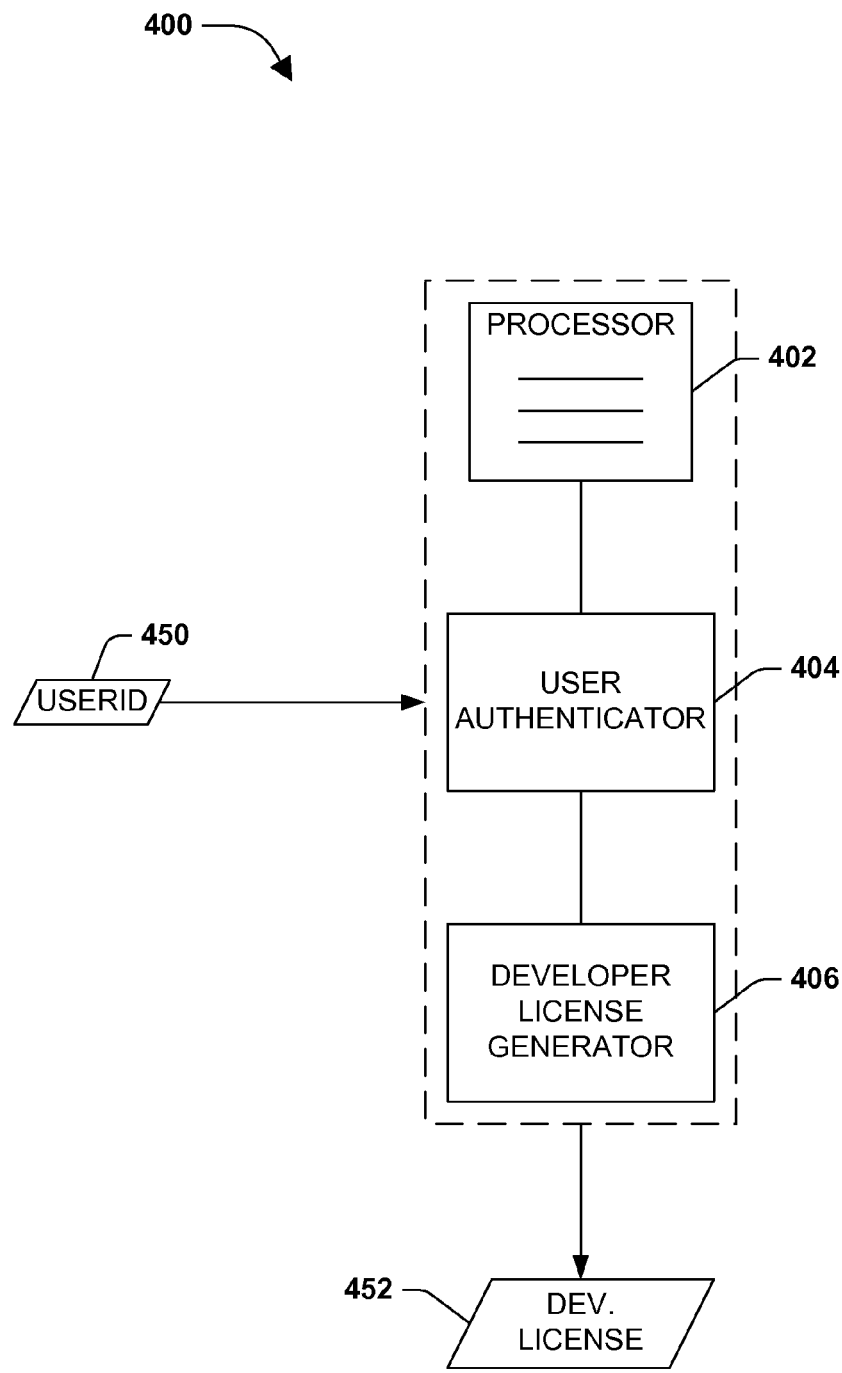
FIG. 4 is a component diagram illustrating an exemplary system for generating a developer license that allows a developer application to run on developer machine.

FIG. 4 is a component diagram illustrating an exemplary system 400 for generating a developer license that allows a developer application to run on a developer machine. The exemplary system 400 comprises a computer-based processor 402 that is configured to process data for the system. The processor 402 is operably coupled with a user authentication component 404 that is configured to authenticate a registered developer based at least upon a registered user identification (userID) 450 for the registered developer.

Further, the authentication component 404 is operably coupled with a developer license generation component 406. The developer license generation component 406 is configured to generate the developer license 452 for the authenticated developer. The developer license allows the developer application to run on a registered developer machine that comprises an authenticated hardware identification (hardwareID), where the developer application is signed by an authenticated developer certificate.

In one embodiment, the developer application can be configured to execute in a device platform environment that is supported by an online application service. In this embodiment, the online application service may provide one or more applications from one or more developers, where the one or more applications are for use in the device platform environment. As an illustrative example, the device platform environment may comprise an operating system configured for a particular type of computing device. In this example, the one or more applications, created by the one or more developers, may be written merely for use in the operating system used by the particular type of computing device.

Further, in this example, the online application service may comprise a web-based service that provides the applications to users, where the applications must be certified (e.g., for security purposes) by the web-based service before they can be made available by the web-based service. In this example, prior to certification and deployment to the web-based service, the developer may wish to write, test and/or execute the developer application on their own developer machine. The exemplary system 400 may be used to generate the developer license that allows the developer to write, test and/or execute the developer application on their own developer machine prior to certification and deployment to the web-based service.

Figure 5:
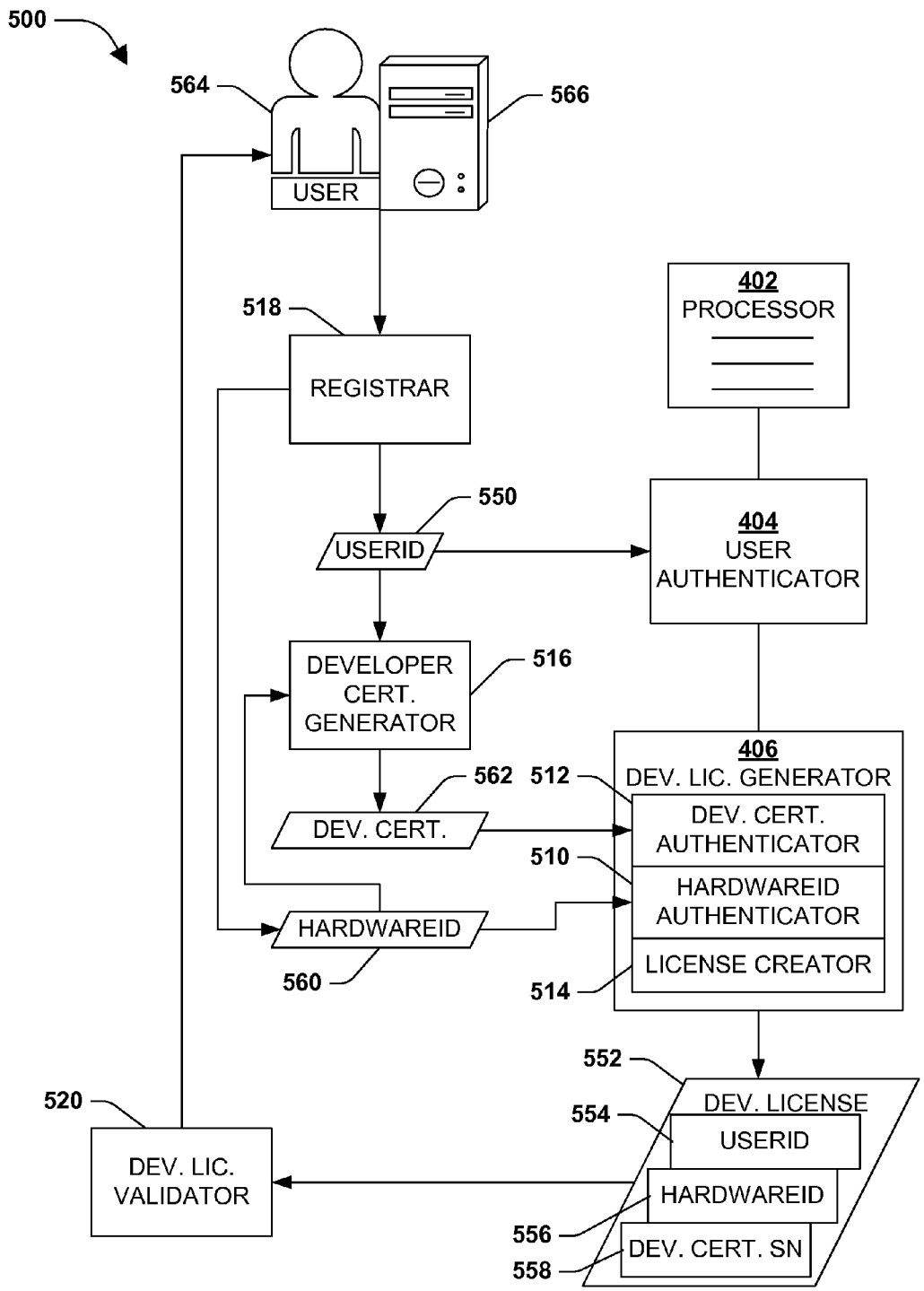
FIG. 5 is a component diagram illustrating an example embodiment where one or more systems described herein may be implemented.

FIG. 5 is a component diagram illustrating an example embodiment 500 where one or more systems described herein may be implemented. In this example 500, an extension of FIG. 4 is provided and thus description of elements, components, etc. described with respect to FIG. 4 may not be repeated for simplicity. In one embodiment, a developer license 552 can comprise a markup language document, for example, that may be generated and stored locally on a developer machine 566. Further, in the example embodiment 500, the developer license 552 can comprise a registered userID 554, an authenticated hardwareID 556, and a serial number (e.g., or other identifier) of an authenticated developer certificate 558.

In the example embodiment 500, the developer license generation component 406 comprises a hardwareID authentication component 510 that can be configured to authenticate a hardwareID 560 resulting in the authenticated hardwareID 556. Further, the developer license generation component can comprise a developer certificate authentication component 512 that can be configured to authenticate a developer certificate 562 resulting in the authenticated developer certificate, as indicated by the authenticated developer certificate serial number 558. Additionally, the developer license generation component can comprise a license creation component 514 that is configured to create the developer license 552, where the developer license 552 comprises the authenticated userID 554, the authenticated hardwareID 556, the authenticated developer certificate identification 558, and where the developer license 552 is signed by a trusted certificate from an online network site (e.g., the online application service).

In the example embodiment 500, a developer certificate generation component 516 can be configured to generate the developer certificate 562 for use in signing the developer application, where the generated developer certificate 562 is valid for a registered developer 564 using a registered developer machine 566. For example, the developer certificate generation component 516 can utilize a userID 550 from the registered developer 564 and/or the hardwareID 560 from the registered developer machine 566 to generate the developer certificate 562 that identifies the registered developer 564 and/or the registered developer's registered machine 566. In this way, the registered developer 564 may use the developer certificate 562 to sign the developer application, for example, providing a trusted verification of the developer's identity, and/or an identity of the developer machine 566, where the developer certificate 562 is rooted in trusted certificate from an online network site (e.g., an online application service).

A registration component 518 can be configured to register a user as the registered developer 564 based at least upon the registered userID 550. That is, for example, a user that has been authenticated by an online service (e.g., by providing personal identification information) can utilize a userID resulting from the user registration to register as a registered developer 564, using the registration component 518. Further,
the registration component 518 can be configured to register a developer machine as the registered developer machine 566 resulting in the hardwareID 560. For example, the registration component may create the hardwareID by combining one or more portions of respective serial numbers from one or more components comprised in the developer machine (e.g., resulting in a unique hardwareID for the developer machine).

In the example embodiment 500, a developer license validation component 520 can be configured to validate the developer license 552, for example, at runtime of the developer application on the registered developer machine 566. The developer license validation component 520 can be configured to determine that the developer license 552 is stored on the registered developer machine, such as stored in a local cache. Further, the developer license validation component 520 can be configured to match the developer license 552 (e.g., a serial number assigned to, and comprised in, the developer license) with a remotely stored developer license (e.g., remotely stored serial number associated with a valid developer license).

Additionally, the developer license validation component 520 can be configured to validate the registered userID 554, the authenticated hardwareID 556, the authenticated developer certificate 558, and/or a license signature, respectively comprised in the developer license 552. For example, at runtime of the developer application on the developer machine, the developer license validation component 520 can find the locally stored developer license 552, and then validate the respective components (e.g., embedded information) of the license prior to allowing the developer application to execute on the developer machine 566. In this way, for example, the online application service may be more assured that merely those applications that are authorized to execute in a particular device platform environment, supported by the online application service, may be run on an authorized developer machine.

Figure 6:
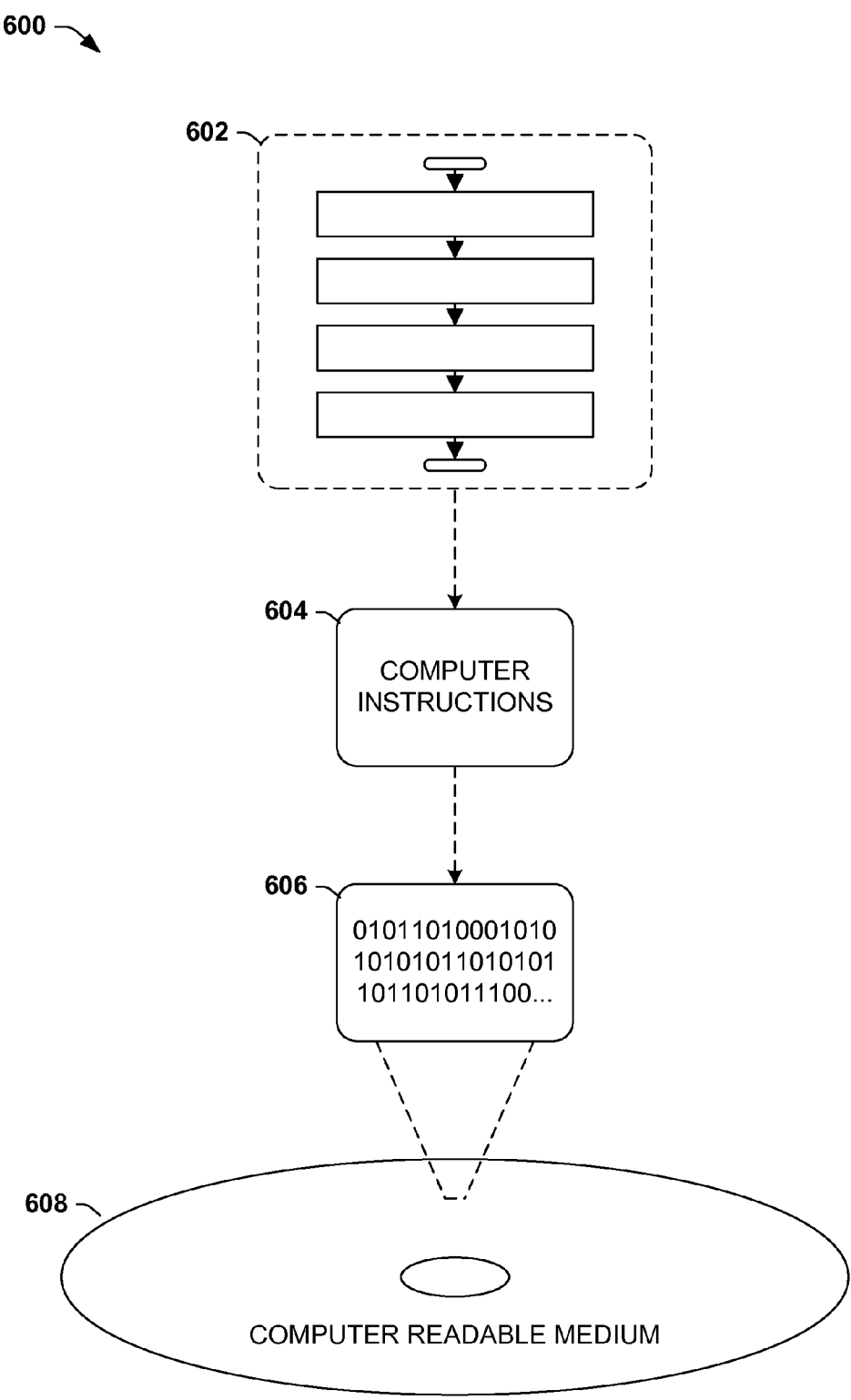
FIG. 6 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as at least some of the exemplary method 100 of FIG. 1, for example. In another such embodiment, the processor-executable instructions 604 may be configured to implement a system, such as at least some of the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
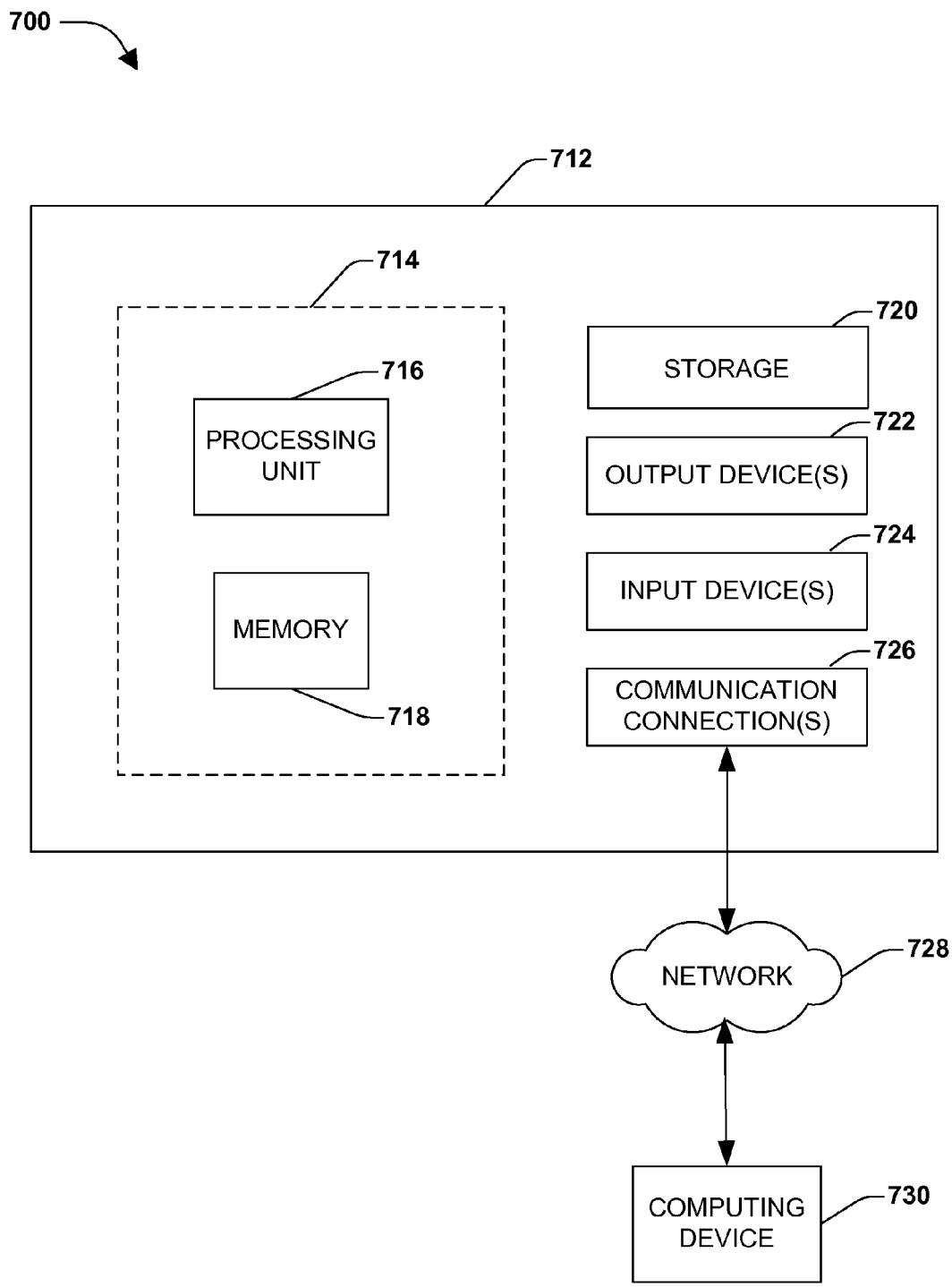
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for generating a developer license that allows a developer application to run on a registered developer machine, comprising:
    authenticating a registered developer based at least upon a registered user identification (userID) for the registered developer;
    registering a developer machine as the registered developer machine resulting in a hardware identification (hardwareID) for the registered developer machine;
    authenticating the registered developer machine based at least upon the hardwareID, the registered developer machine used by the registered developer to develop at least some of the developer application, the hardwareID comprising a combination of a first portion of a first serial number of a first piece of hardware of the registered developer machine and a second portion of a second serial number of a second piece of hardware of the registered developer machine, the first piece of hardware different than the second piece of hardware; and
    generating the developer license responsive to the authenticating a registered developer and the authenticating the registered developer machine, the developer license providing for the registered developer to run the developer application on the registered developer machine.

2. The method of claim 1, the developer license comprising the registered userID, the hardwareID, and an identification associated with a developer certificate that is used to sign the developer application.

3. The method of claim 1, the generating comprising signing the developer license with a trusted certificate from a first online network site.

4. The method of claim 1, comprising registering a user as the registered developer based at least upon the registered userID.

5. The method of claim 1, at least one of the first piece of hardware or the second piece of hardware comprising at least one of a basic input/output system (BIOS), a motherboard, a video card, a hard disk drive, an input device, memory or a processing unit.

6. The method of claim 1, comprising generating a developer certificate for the registered developer, the developer certificate rooted in a verified certificate for a second online network site, and the developer certificate used to sign the developer application.

7. The method of claim 6, comprising one or more of:
    storing the developer certificate locally on the registered developer machine; or
    storing the developer license locally on the registered developer machine.

8. The method of claim 1, comprising enforcing the developer license for the developer application on the registered developer machine, comprising:
    allowing the developer application to run on the registered developer machine if the developer license is validated; and
    not allowing the developer application to run on the registered developer machine if the developer license is not validated.

9. The method of claim 8, the developer license not validated if the developer application is not signed by a developer certificate that is authenticated.

10. The method of claim 8, the developer license not validated if the developer license is not stored locally on the registered developer machine.

11. The method of claim 8, comprising validating the developer license, comprising one or more of:
    validating the registered userID;
    validating the hardwareID;
    validating a developer certificate comprising the registered userID, the hardwareID, and an identification associated with the developer certificate;
    matching the developer license, stored locally on the registered developer machine, with a remotely stored developer license for the registered developer; or
    validating a signature of an issuer of the developer license, the signature comprised in the developer license.

12. The method of claim 8, comprising validating the developer license at runtime of the developer application.

13. A system for generating a developer license that allows a developer application to run on a registered developer machine, comprising:
- a processing unit configured to process data for the system;
- a user authentication component, operably coupled with the processing unit, configured to authenticate a registered developer based at least upon a registered user identification (userID) for the registered developer;
- a registration component configured to register a developer machine as the registered developer machine resulting in a hardware identification (hardwareID) for the registered developer machine;
- a hardwareID authentication component configured to authenticate the registered developer machine based at least upon the hardwareID, the registered developer machine used by the registered developer to develop at least some of the developer application, the hardwareID comprising a combination of a first portion of a first serial number of a first piece of hardware of the registered developer machine and a second portion of a second serial number of a second piece of hardware of the registered developer machine, the first piece of hardware different than the second piece of hardware; and
- a developer license generation component configured to generate the developer license responsive to the user authentication component authenticating the registered developer and the hardwareID authentication component authenticating the registered developer machine, the developer license allowing the developer application to run on the registered developer machine.

14. The system of claim 13, the developer license comprising a markup language document comprising the registered userID, the hardwareID, and a serial number of a developer certificate that is used to sign the developer application.

15. The system of claim 13, the developer application configured to execute in a device platform environment supported by an online application service that provides one or more applications from one or more developers, the one or more applications for use in the device platform environment.

16. The system of claim 13, the developer license generation component comprising a license creation component configured to create the developer license, the developer license comprising the registered userID, the hardwareID, an identification associated with a developer certificate, and a signature comprising a trusted certificate from an online network site.

17. The system of claim 16, comprising a developer certificate generation component configured to generate the developer certificate for use in signing the developer application.

18. The system of claim 13, the registration component configured to:
- register a user as the registered developer based at least upon the registered userID.

19. The system of claim 13, comprising a developer license validation component configured to perform one or more of:
- determine that the developer license is stored on the registered developer machine;
- match the developer license with a remotely stored developer license;
- validate the registered userID;
- validate the hardwareID;
- validate a developer certificate; or
- validate a signature comprised in the developer license.

20. A computer readable device comprising instructions that when executed perform a method for generating a developer license that allows a developer application to run on a registered developer machine, comprising:
- authenticating a registered developer based at least upon a registered user identification (userID) for the registered developer;
- registering a developer machine as the registered developer machine resulting in a hardware identification (hardwareID) for the registered developer machine;
- authenticating the registered developer machine based at least upon the hardwareID, the hardwareID comprising a combination of a first portion of a first serial number of a first piece of hardware of the registered developer machine and a second portion of a second serial number of a second piece of hardware of the registered developer machine, the first piece of hardware different than the second piece of hardware; and
- generating the developer license responsive to the authenticating a registered developer and the authenticating the registered developer machine, the developer license providing for the registered developer to run the developer application on the registered developer machine.

\* \* \* \* \*